United States Patent [19]

Otto et al.

[11] Patent Number: 5,110,368

[45] Date of Patent: May 5, 1992

[54] DEVICE FOR SPATIALLY TRANSMITTING A PLURALITY OF SIGNALS OVER A FIBEROPTIC MONOFILAMENT

[75] Inventors: William F. Otto, Huntsville; Miles E. Holloman, Decatur; Debbee J. Jordan, Huntsville, all of Ala.

[73] Assignee: The United States of America as represented by the Secretary of the Army, Washington, D.C.

[21] Appl. No.: 580,011

[22] Filed: Sep. 10, 1990

[51] Int. Cl.$^5$ ................. H01L 31/052; G02B 27/00
[52] U.S. Cl. ................. 136/246; 136/292; 250/227.11; 250/551; 385/15; 385/123
[58] Field of Search ............ 136/246, 292; 250/551, 250/227.11, 227.32, 227.23; 350/96.3, 96.29, 96.15

[56] References Cited

U.S. PATENT DOCUMENTS

| | | | |
|---|---|---|---|
| 4,211,468 | 7/1980 | Steensma | 350/96.10 |
| 4,834,497 | 5/1989 | Angel | 350/96.29 |
| 4,976,789 | 12/1990 | Holloman et al. | 136/246 |

OTHER PUBLICATIONS

"Engineers Design New Power Sources for Missile tests" The Redstone Rocket, Huntsville, Ala., Jul. 26, 1989, pp. 6 and 7.

*Primary Examiner*—Aaron Weisstuch
*Attorney, Agent, or Firm*—Freddie M. Bush; Howard G. Garner

[57] ABSTRACT

A transmitting device for transmitting a plurality of spatially separate laser beams over a single fiberoptic glass monofilament, for conveying a plurality of signals without multiplexing. Means are provided for generating a plurality of laser beams, each of which are directed into the core of the fiberoptic monofilament of glass at a different angle to the longitudinal axis of the monofilament. Each of the beams also exits from the exiting end of the monofilament at different angles. Those inserted at an angle of the longitudinal axis exit in a conical annulus having the same angle as the angle in which the beam was originally inserted into the monofilament. Means are provided for intercepting each of said signals as they exit from the exiting end of the monofilament and converting them into electrical energy or extracting data therefrom.

10 Claims, 3 Drawing Sheets

DEVICE FOR SPATIALLY TRANSMITTING A PLURALITY OF SIGNALS OVER A FIBEROPTIC MONOFILAMENT

DEDICATORY CLAUSE

The invention described herein may be manufactured, used, and licensed by or for the Government for governmental purposes without the payment to us of any royalties thereon.

BACKGROUND OF THE INVENTION

This invention relates to a device for transmitting a plurality of spatially separate laser beams over a single fiberoptic monofilament. More particularly, this invention relates to a device for sending more than one signal over a single monofilament without the necessity of using a multiplexer to mix the signals. The signals are sent separately and do not need to be demultiplexed at the exit end. The signals transmitted can be either power or communication signals or a combination of the two.

In the past the practice has been to multiplex signals before sending them over a single fiberoptic monofilament by using electronic multiplexing or fiberoptical multiplexing techniques. Electronic multiplexers combine two or more signals to produce an electronic signal to drive a fiberoptic transmitter. Therefore, the fiberoptical signal is a composite of the input signals. These signals are then separated at the end of the fiberoptic monofilament by means of a demultiplexer. Optical multiplexers send two or more signals at different wavelengths down a fiberoptic monofilament by using a multiplexer to combine the fiberoptic signals into a single signal. At the end of the fiberoptic monofilament the signals exiting from the end of monofilament are separated by wave length by a demultiplexer.

The transmitting device of the invention is particularly useful where it is necessary to provide electric power to remote locations. This is particularly true where electric wires would disturb the balance of the magnetic atmosphere and where batteries are not adequate for providing the power needs. In testing missile telemetry packages, it is necessary to provide a source of electricity to test the reaction of various devices to electromagnetic fields. It is also necessary to transmit signals from the telemetry package to the testing machine. In this environment, any conductive cables would change the field and would, therefore, not give accurate test results.

SUMMARY OF THE INVENTION

It is an object of the invention to provide a device for transmitting a plurality of spatially separate laser beams over a single fiberoptic monofilament.

It is further object of the invention to provide a transmitting device which will transmit a plurality of laser beams for generating electrical power and carrying a signal through the same fiberoptic monofilament.

An alternative for delivering power to such devices is to utilize a fiberoptic monofilament to direct light to photovoltaic cells located within the electromagnetic field within the missile. In this system, photovoltaic cells convert the light beams into electrical power. Such photovoltaic cells typically provide voltages in the range of 0.5 to 1.0 volts. Where a higher voltage is required a plurality of photovoltaic cells are connected in series. , However, in connecting the cells in series it becomes difficult to distribute the light from the fiberoptic monofilament equally or uniformly to all of the cells. If the light is not distributed equally to all of the cells, and one or more of cells do not receive the same fiberoptic power as the other cells they will not produce as high a current as the others. The cell receiving the least fiberoptic power will set the current limit for all of the cells when they are connected in series. Thus, it becomes essential to have an equal distribution of the light onto the cells since uneven distribution causes a loss in the overall efficiency of all of the cells. The series connecting means is also not the best in compact applications where there is not enough space for the required number of photovoltaic cells.

In applicants' prior co-pending patent application, Ser. No. 07/456,899, filed Dec. 26, 1989, for "Power Transmission Device" (now U.S. Pat. No. 4,976,789), a single laser beam is directed into the receiving end of a glass fiberoptic monofilament at an angle to an its longitudinal axis and the beam exits from the other end of the fiberoptic monofilament in a conical annulus of light at the same angle as that which the light was directed into the fiberoptic monofilament. This annulus evenly distributes the laser light onto a plurality of photovoltaic cells, which are connected in series, to generate the required electric power. The invention in our prior patent was restricted to the transmission of power from a single laser beam and was restricted in the amount of power that it could transmit. Furthermore, the invention of the prior application could not transmit signals in addition to the power.

The present invention provides for the transmission of a plurality of spatially separate laser beams for transmitting electrical power and/or signals without the need of multiplexers. In the present invention a plurality of laser beams are directed into the receiving end of an fiberoptic monofilament at diverse angles to the longitudinal axis of the monofilament. Each of these beams exit from the other end of the monofilament at the same angle to the monofilament's longitudinal axis as it entered the monofilament, producing a ring or annulus of light for each beam. The light exiting the exit end of the monofilament can be used to transmit signals or to generate electric power on a multiplicity photovoltaic cells or to convey a plurality of signals to photodetectors.

DETAILED DESCRIPTION OF THE INVENTION

Figure 1:
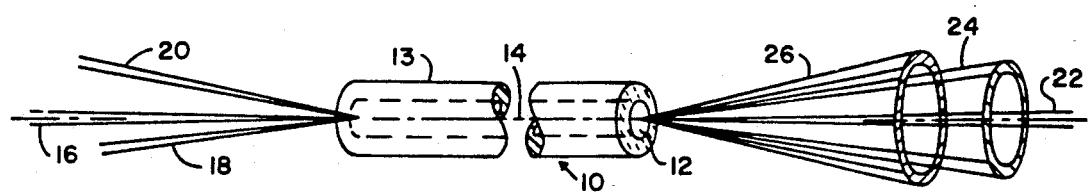
FIG. 1 is a perspective view of an fiberoptic glass monofilament showing the transmittal of a plurality of laser beams through the monofilament.

Referring now to FIG. 1, which shows a fiberoptic glass monofilament 10. Monofilament 10 has a glass core 12 and an outer cladding layer 13 which combine to permit monofilament 10 to transmit light beams from one end of the monofilament to the other end. At the receiving end of the monofilament 10 a plurality of laser beams 16, 18, and 20 are directed into the core 12 of the monofilament. Each of the laser beams 16, 18, and 20 are directed into the core at a different angle with respect of the longitudinal axis 14 of the monofilament. In the example shown in FIG. 1, beam 16 is directed into the core 12 parallel to longitudinal axis 14; laser beam 18 is directed into the core of monofilament 10 at an angle of 8° to the longitudinal axis of the monofilament 10; and laser beam 20 is directed into the core of monofilament 10 at an angle of 12° to the longitudinal axis 14 of monofilament 10.

At the exiting end of monofilament 10 each of laser beams 16, 18, and 20 exit from the monofilament at the same angle in which they entered the monofilament. Laser beam 16, exits as a solid beam 22. Laser beam 18, exits from the exit end of monofilament 10 in a conical annulus 24 which has the same angle to the longitudinal axis of the monofilament as beam 18 entered into the receiving end of the monofilament. In this particular example conical annulus 24 has an angle of 8°. Laser beam 20, exits from the monofilament 10 in a conical annulus 26 at an angle of 12°, the same angle in which laser beam 20 entered into the core of monofilament 10. Each of beams 22, 24, and 26 are separate and distinct from each other and contains the information or power imparted to receiving end of the core by the laser beam. It is to be understood that the three beams of FIG. 1 are given only as an example, in that the same separation occurs when a multiplicity of laser beams are inserted into the fiberoptic monofilament and each of the beams exits from the exit end of the monofilament at the same angle that they entered into the monofilament.

Figure 2:
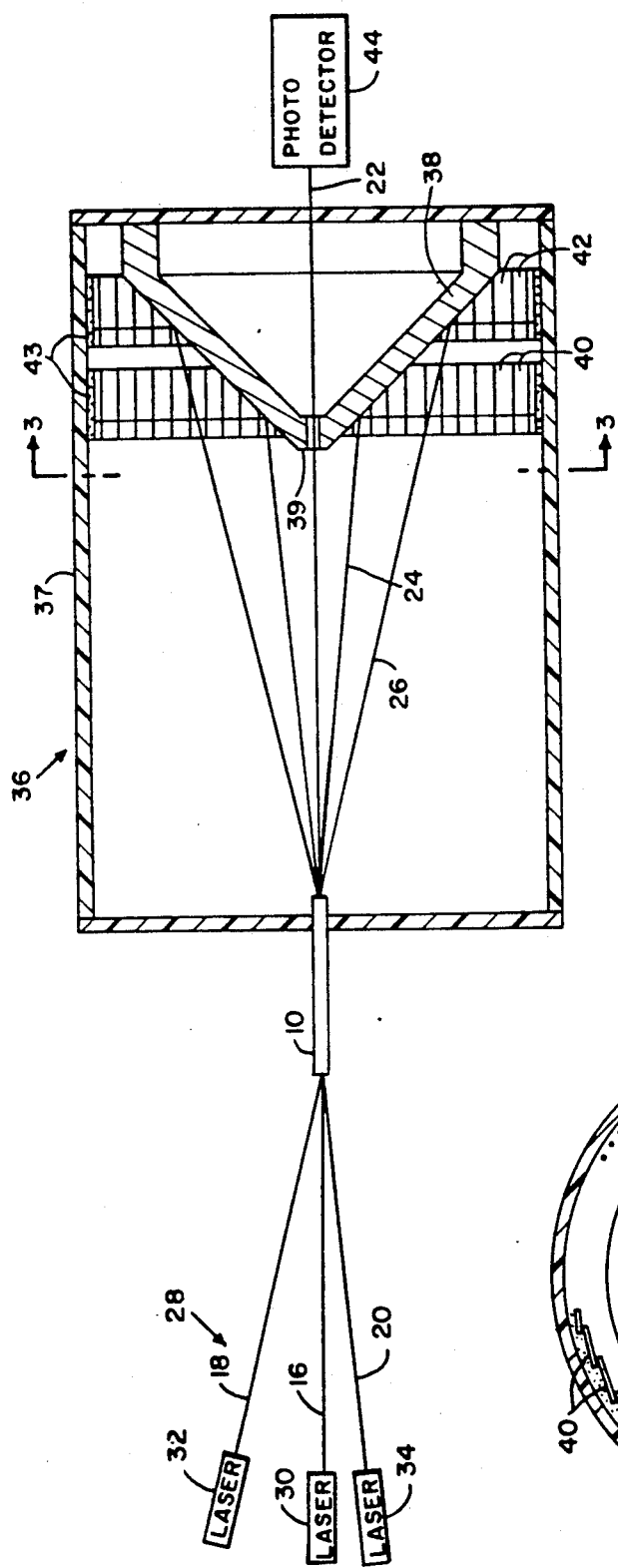
FIG. 2 is a plan view of a device, for transmitting and receiving a plurality of spatially separate laser beams according to the invention.

Referring now to FIG. 2 of the drawings, wherein is illustrated a device for transmitting and receiving a plurality of spatially separate laser beams over a single fiberoptic monofilament. In this instance monofilament 10 receives a plurality of laser beams 16, 18, 20 from a plurality of lasers 30, 32, and 34, respectively. Each of the laser beams enters into the core of monofilament 10 at a different angle to the longitudinal axis of the monofilament. The plurality of lasers constitute a spatial energy transmitter 28. The monofilament 10 is directed into a spatial energy receiver 36 which comprises a container or housing 37, which supports a conical reflector 38 which has a center opening 39 therein. Disposed about the conical reflector 38 are a plurality of photovoltaic cells, arrayed in two rows 40 and 42. These rows are disposed to intercept horizontal reflections from annuli 24 and 26, respectively. The reflections are used to generate electrical power in the photovoltaic cells of rows 40 and 42.

Figure 6:
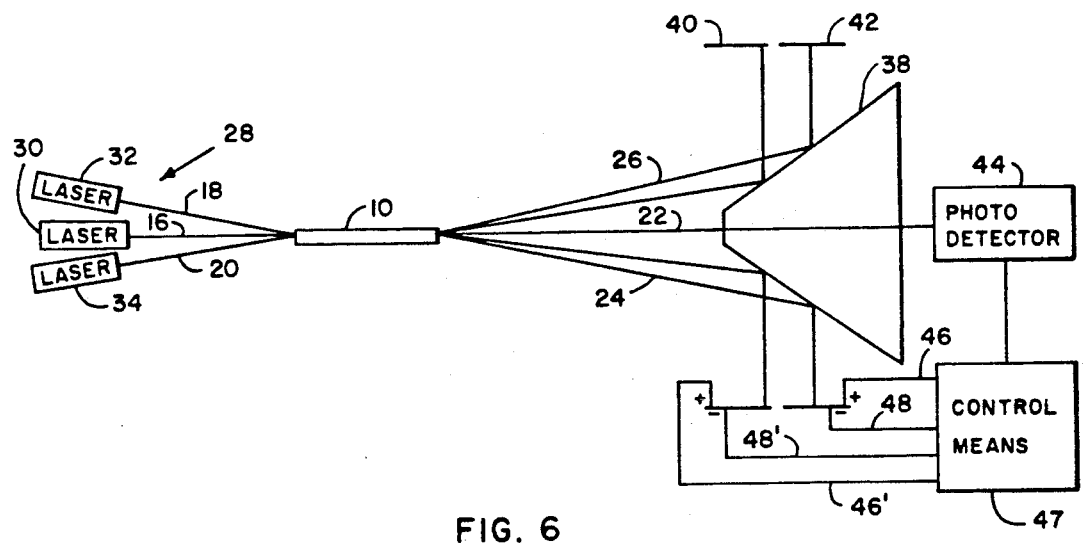
FIG. 6 is a schematic view of the apparatus of FIG. 2.

The central beam 22, in this example as seen in FIGS. 2 and 6, is used to convey information to control means 47 which may control the operation of the device. In another instance beam 22 may go in the opposite direction and carry back data from the testing device in the opposite direction to indicate the amount of current generated or other data detected during the testing procedure. In this event laser 30 would be replaced by means to detect or receive and decode the data contained therein.

Figure 3:
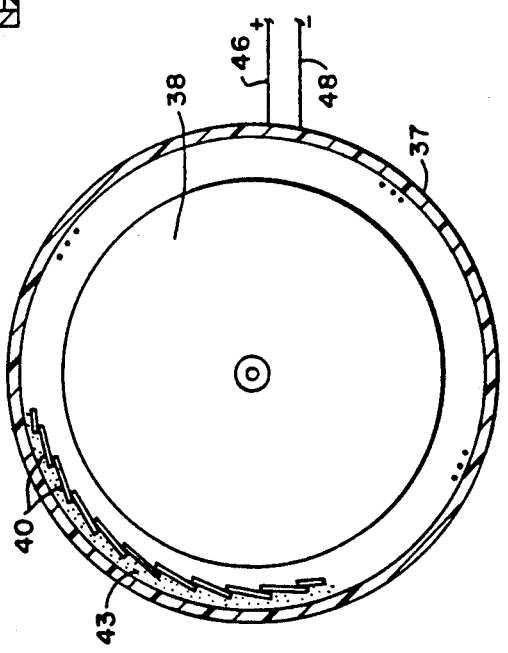
FIG. 3 is sectional view of the receiver of FIG. 2 taken along line 3—3 of FIG. 2.

Details of the arrangement of photovoltaic cells 40 are illustrated, in FIG. 3 wherein the cells 40 are arranged in a circular path so that each cell overlaps adjacent cells the same amount and the cells in row 40 are held in placed by a bonding agent 43, bonding the cells to the walls of container or housing 37. The power generated by the cells is taken off by output leads 46 and 48.

Figure 5:
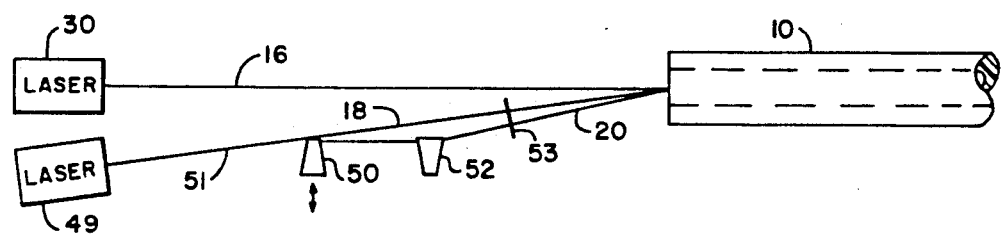
FIG. 5 is a perspective view of an alternative embodiment of the invention.
Figure 4:
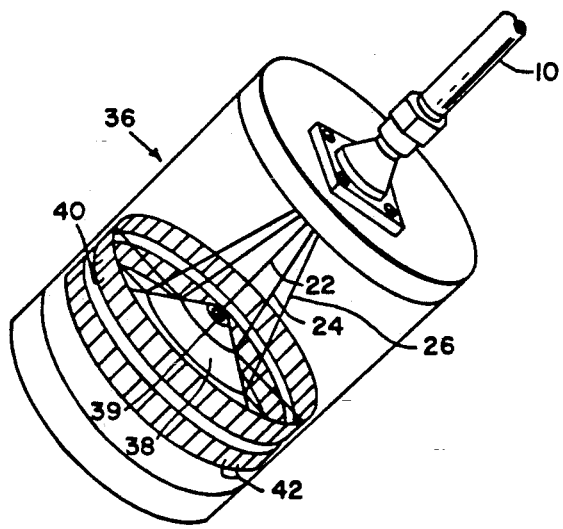
FIG. 4 is a perspective view of the receiving device of FIG. 2.

Referring now to FIG. 5, therein is shown an alternative embodiment for inserting the laser beams into the monofilament 10. In this embodiment laser beam 16 is generated by lasers and carries information as was the case in the embodiment of FIG. 2. In this embodiment lasers 32 and 34 are replaced by a single laser 49. The laser beam 51 generated by laser 49 is separated into two beams 18 and 20 by means of prisms 50 and 52, which are supported adjacent the laser by suitable means. Prism 50 is supported by a Vernier screw for adjusting its position in order to split the laser beam 51 into two equal components. Prism 52 is fixed to direct beam 20 into the core of monofilament 10 In this manner a single laser 49 replaces two of the lasers in the device of FIG. 2 and serves to generate the power in same manner as described above, in reference to FIG. 2. A lens 53 focuses beams 18 and 20 into core 12 of monofilament 10.

FIG. 6 also shows a wiring schematic illustrating how the photovoltaic cells of rows 40 and 42 are connected in series to provide the necessary electrical power.

Figure 7:
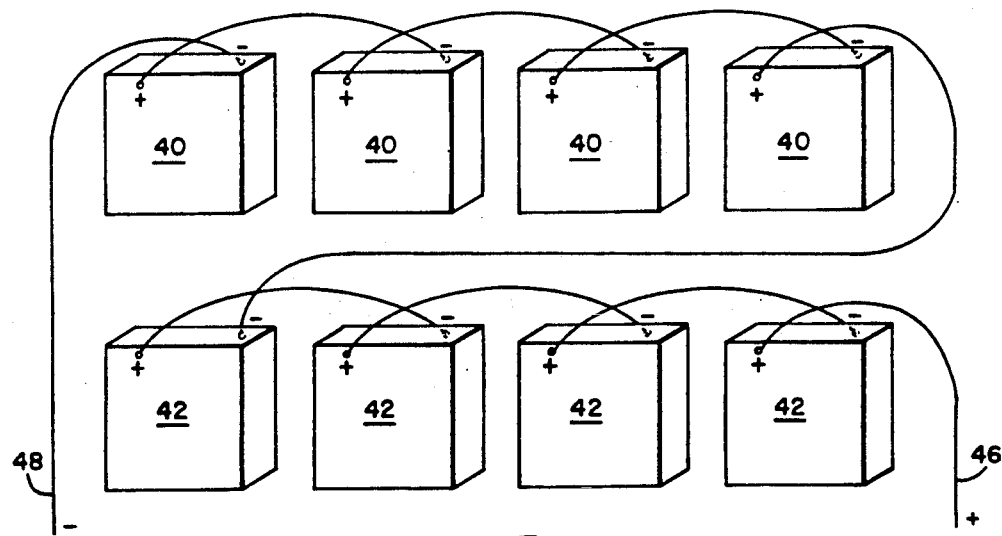
FIG. 7 is a perspective view of the photovoltaic cells of the invention, wired in series, in accordance with FIG. 2.

FIG. 7 is an exploded, view of the rows of photovoltaic cells 40 and 42 which are wired as shown. Photovoltaic cells 40 and the cells 42 are composed of frangible and brittle materials and must be in overlapping relationship to each other as seen in FIG. 3 so as to provide an even distribution in the receiver 36.

We claim:

1. A device for transmitting a plurality of spatially separate laser beams over a single fiberoptic monofilament and, for conveying said plurality of signals, comprising:
   (a) laser means for generating a plurality of spatially separate laser beams;
   (b) means for inputting a signal into at least one of said laser beams;
   (c) a fiberoptic glass monofilament having a glass core with a predetermined refractive index and a cladding layer having a different refractive index, having a receiving end and exiting end for receiving and conveying a plurality of laser beams;
   (d) means for directing each of said spatially separate laser beams into said receiving end of said monofilament, at an angle to the longitudinal axis of said monofilament, each of which differs from the angle of each of the other laser beams whereby each of said laser beams exits from exiting end of said monofilament in a conical annulus having the same angle as the angle said laser beam was directed into the receiving end of said monofilament; and
   (e) means spaced from each other for intersecting each of said annuli for extracting energy contained therein.

2. A transmitting device as set forth in claim 1, wherein said laser means comprises a plurality of laser generating devices.

3. A transmitting device as set forth in claim 1, wherein said laser means comprises means for generating at least one laser beam and means for dividing the said at least one laser beam generated by said laser means into at least two beams each of is which directed into said monofilament at a different angle to the longitudinal axis of said monofilament.

4. A transmitting device as set forth in claim 3, wherein said at least one laser beam is split by prisms.

5. A transmitting device as set forth in claim 1, wherein at least one of said laser beams carries data.

6. A transmitting device as set forth in claim 5, wherein said at least one laser beam, which carries said data, extends substantially parallel to the longitudinal axis of said monofilament.

7. A transmitting device as set forth in claim 1, wherein said spaced means for intersecting said conical annuli comprises a conical reflector for reflecting one or more said laser beams onto a plurality of photovoltaic cells evenly spaced about said conical reflector means.

8. A transmitting device as set forth in claim 7, wherein said spaced means for intersecting said annuli comprises a control device for intercepting a laser beam carrying data.

9. A transmitting device as set forth in claim 1, wherein said spaced means for intersecting said annuli comprises two rows of a plurality of photovoltaic cells.

10. A transmitting device as set forth in claim 9, wherein said photovoltaic cells are connected in series.

* * * * *